United States Patent [19]

Srivastava et al.

[11] Patent Number: 6,151,145
[45] Date of Patent: Nov. 21, 2000

[54] TWO-WAVELENGTH WDM ANALOG CATV TRANSMISSION WITH LOW CROSSTALK

[75] Inventors: Atul Kumar Srivastava, Eatontown; Thomas Huntington Wood, Holmdel; John Lehrer Zyskind, Shrewsbury, all of N.J.

[73] Assignee: Lucent Technologies Inc., Murray Hill, N.J.

[21] Appl. No.: 09/010,617

[22] Filed: Jan. 22, 1998

Related U.S. Application Data

[60] Provisional application No. 60/037,753, Feb. 13, 1997.

[51] Int. Cl.$^7$ ..................................................... H04J 14/02
[52] U.S. Cl. .......................... 359/133; 359/124; 359/125
[58] Field of Search ................................... 359/124, 125, 359/133, 156

[56] References Cited

U.S. PATENT DOCUMENTS 5,737,109  4/1998  Goodwin .................................. 359/161
5,828,477  10/1998  Nilsson et al. ........................... 359/181

OTHER PUBLICATIONS

T. H. Wood et al., "Two–wavelength WDM analog CATV trasmission with low cross talk", IEEE Technical Digest, Feb. 16–21, 1997 pp. 320–321.

"Signal Crosstalk Due to Fiber Nonlinearity in Wavelength Multiplexed SCM–AM–TV Transmission Systems"; K. Kikushima, H. Yoshinaga and M. Yamada; Proceedings of the Conference on Optical Fiber communication, 1995, paper PD–24–1–PD–24–5.

"Experimental Confirmation of Crosstalk due to Stimulated Raman Scattering in WDM AM–VSB CATV Transmission Systems" A. Li, c. J. Mahon, Z. Wang, G. Jacobsen and E. Bodtker; Electronics Letters, vol. 31, pp.1538–1539, 1995.

Limitations on Lightwave Communications Imposed by Optical–Fiber Nonlinearities; A. R. Chraplyvy; Journal of Lightwave Technology, vol. 8,No. 10,Oct. 1990, IEEE, pp. 1548–1557.

"Simulataneous Suppression of Stimulated Brillouin Scattering and Interferometric Noise in Externally Modulated Lightwave AM–SCM Systems"; F. W. Willems, W. Muys and J. S. Leong; IEEE Photonics Technology Letters, vol. 6, No. 12, Dec. 1994 IEEE, pp. 1476–1478.

*Primary Examiner*—Leslie Pascal
*Assistant Examiner*—Dalzid Singh
*Attorney, Agent, or Firm*—Jeffery J. Brosemer

[57] ABSTRACT

A two-wavelength WDM analog CATV transmission system which utilizes wavelength channel spacing of about 2.2 nm and laser-dithering. The system includes a pair of optical transmitters (DBF lasers), a pair of modulators, a dithering device, a polarization controller, a 3-dB combiner, an optical amplifier (EDFA), an attenuator, a length of optical fiber, a filter and a CATV receiver. The two lasers have wavelengths of $\lambda 1$ and $\lambda 2$, where the difference between $\lambda 1$ and $\lambda 2$ is approximately 2.2 nm. The modulators are driven with analog signals comprising 77 NTSC channels between 55.25 and 535.25 MHz A 2-GHz dithering tone is applied to the $\lambda 1$ laser and the output of the $\lambda 2$ laser is passed through the polarization controller to align the polarization of the two transmitters. The two modulated and aligned outputs are combined by the 3-dB combiner and launched into the EDFA The output of the EDFA is divided by the splitter four ways and one of the four outputs is passed through the attenuator and launched into the transmitting end of the optical fiber. The receiving end of the fiber is connected to a filter, which provides input into the CATV receiver. By utilizing a wavelength channel spacing of about 2.2 nm and dithering one of the lasers, worst-channel Composite Triple Beat distortion is reduced to –60 dBc, an acceptable level for deployment of WDM analog CATV systems.

37 Claims, 9 Drawing Sheets

λ 1 CTB AND CSO DISTORTION

λ 1 CTB AND CSO DISTORTION

λ 1 CTB AND CSO DISTORTION

EXPERIMENTAL LAYOUT FOR CROSSTALK MEASUREMENTS

CROSSTALK vs. LAUNCHED POWER. OTHER λ AT +9 dBm
450 MHz, TWEAKED ONCE FOR MAX. XTALK. Δλ = 2.5 nm

TWO-WAVELENGTH WDM ANALOG CATV TRANSMISSION WITH LOW CROSSTALK

CROSS REFERENCE TO RELATED APPLICATIONS

This application claims the benefit of U.S. Provisional Application Ser. No. 60/037,753 filed Feb. 13, 1997.

FIELD OF THE INVENTION

The present invention relates generally to CATV transmission over optical fiber. More particularly, the invention relates to the reduction of crosstalk in two-wavelength WDM analog CATV transmission over optical fiber.

BACKGROUND OF THE INVENTION

In the traditional cable television system, video signals from satellites and television stations are received at a control center ("head end"). The head end combines video signals from various sources and sends the signals to regional hubs for distribution to local nodes and individual cable subscribers.

The links between the head end and the regional nodes ("supertrunks") must carry 30 to 100 or more video channels from a cable system head end to points many kilometers away. In the early CATV systems, coaxial cable and microwave towers were used for supertrunks to cover such distances. However, coaxial cable and microwave links tended to be somewhat noisy. Further, coaxial cable for such lengths required many repeaters or amplifiers and the failure of one repeater or amplifier could cause interruption of cable service to numerous subscribers.

Optical fibers offered a solution to these problems and by the late 1980s, fibers had become a standard for CATV supertrunks. Since then, optical fiber systems have spread further into CATV distribution networks. With CATV optical fiber systems in place, a logical step in order to increase capacity is to multiplex the video signals. Time division, frequency division and other types of multiplexing have been successfully utilized in voice and data telecommunications.

Dense wavelength division multiplexing (WDM) is being rapidly deployed in high-speed digital networks, particularly in long-haul 2.5 and 10 Gbits/sec systems. In addition to providing greater capacity over a single link, WDM affords some tools for networking, such as separating different CATV service options by grouping them on different wavelengths. As in any analog transmission, the carrier-to-noise ratio (CNR) of the CATV transmission must be adequate in order to provide a high-quality signal to the cable subscriber. Therefore, in applying WDM to CATV transmission, it is important to minimize all sources of noise and crosstalk. Analog CATV fiber transmission systems could take advantage of WDM, both for upgrading capacity and network flexibility, but it appears that WDM analog CATV fiber systems suffer from large crosstalk due to optical fiber nonlinearity at even modest optical power levels. For example, a 1.3 $\mu$m 2-wavelength dense WDM system showed −42 dBc of crosstalk with a launched power of +9 dBm/channel. (See K. Kikushima, H. Yoshinaga and M. Yamada, "Signal Crosstalk Due to Fiber Nonlinearity in Wavelength-Multiplexed SCM-AM-TV Transmission systems," *Proceedings of the Conference on Optical Fiber Communication,* 1995, paper PD-24.)

In another case, a similar system at 1.5 $\mu$m showed −47 dBc of crosstalk at an identical launched power. See A. Li, C. J. Mahon, Z. Wang, G. Jocobsen and E. Bodtker, "Experimental Confirmation of Crosstalk Due to Stimulated Raman Scattering in WDM AM-VSB CATV Transmissions Systems," *Electronics Letters,* vol. 31, pp. 1538–1539 (1995). It appears that this crosstalk is due to Stimulated Raman Scattering (SRS), even though the launched power levels are much lower than those known to cause significant SRS degradation in digital systems. Since this crosstalk appears as a spurious carrier at the center of an RF channel when the desired carrier is turned off, it mimics a Composite Triple Beat (CTB) signal, and thus, needs to be suppressed to −60 to −65 dBc. If not suppressed to these levels, then this large, nonlinear crosstalk severely limits the usefulness of WDM in analog CATV fiber systems.

SUMMARY OF THE INVENTION

The present invention provides a solution to unacceptable levels of crosstalk in WDM video transmission through optic fibers. In a preferred embodiment, the present invention is a WDM video transmission system comprising laser is transmitting a $\lambda 1$ wavelength, a laser transmitting a $\lambda 2$ wavelength, a modulator and a video signal for both wavelengths, and a combiner which optically multiplexes the modulated $\lambda 1$ and $\lambda 2$ wavelength signals into a single output.

In order to reduce SRS degradation, the present invention utilizes wavelength spacing between $\lambda 1$ and $\lambda 2$ of approximately 2.2 nanometers. Although the 2.2 nm wavelength spacing provides acceptable crosstalk levels between about 55.25 MHz and 325.25 MHz, crosstalk levels remain excessive in the 331.25 MHz to 535.25 MHz range.

Accordingly, the present invention includes a dither applied to at least one of the lasers. By dithering the transmitter laser, crosstalk throughout the 55.25 MHz to 535.25 MHz range is suppressed to an acceptable level.

One object of the present invention is to provide a video transmission system capable of carrying at least two 77-channel signals through a single optical fiber.

Another object of the present invention is to provide a video transmission system which utilizes wavelength-division multiplexing in carrying analog CATV signals through optical fiber with low crosstalk between channels.

BRIEF DESCRIPTION OF THE DRAWING

FIG. 4 is a graph of CTB and CSO distortions versus frequency in the video carried by wavelength $\lambda 1$ with modulation of wavelength $\lambda 2$ on and the dither for wavelength $\lambda 1$ on;

FIG. 5 is a graph of CTB and CSO distortions versus frequency in the video carried by wavelength $\lambda 1$ with modulation of wavelength $\lambda 2$ off and the dither for wavelength $\lambda 1$ on;

DETAILED DESCRIPTION OF THE INVENTION

Figure 1:
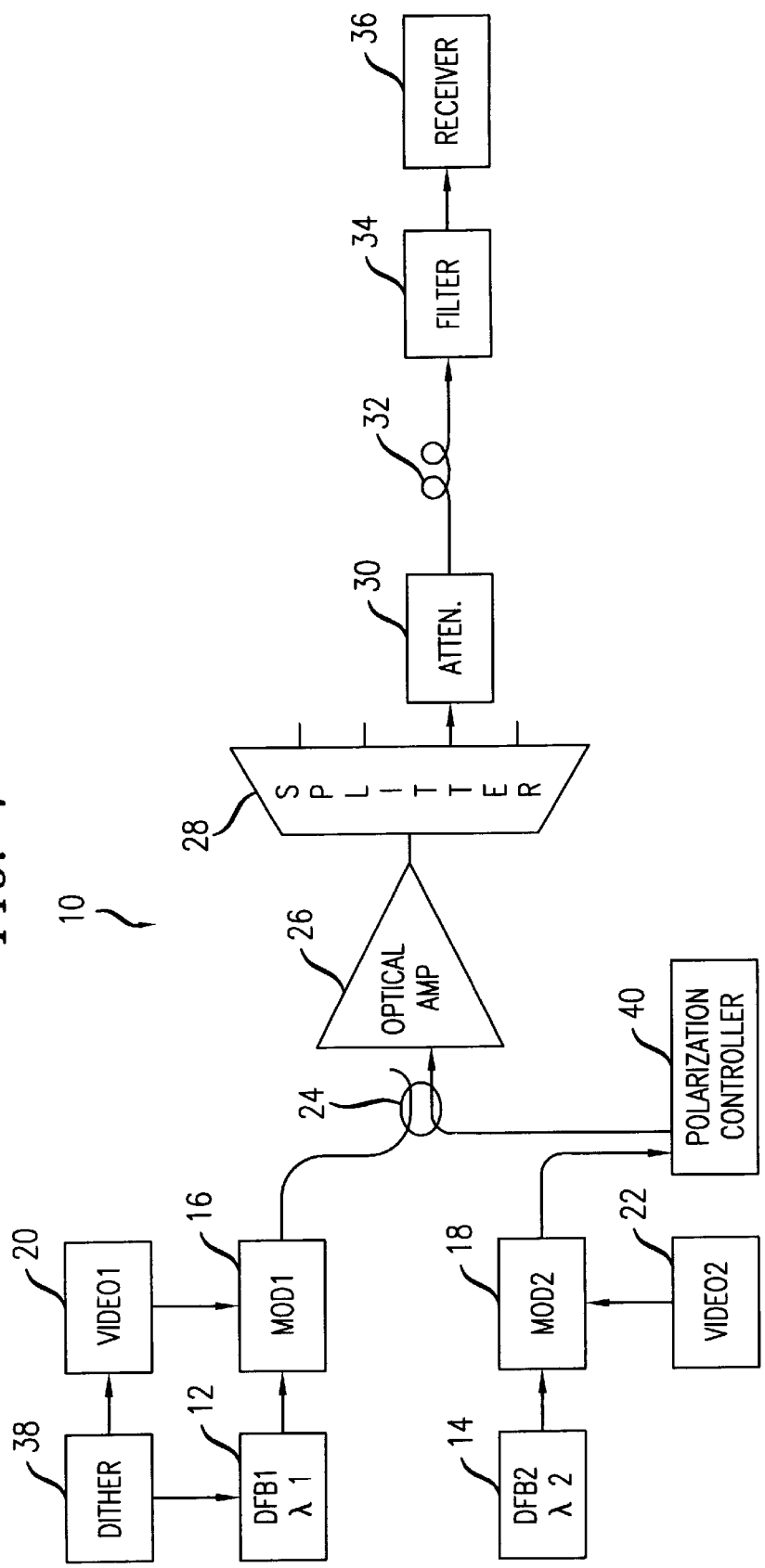
FIG. 1 is a diagram of a wavelength-division-multiplexed video transmission system constructed in accordance with the present invention.

Vestigial Sideband Amplitude Modulation (VSB-AM) is very attractive for CATV systems on optical fiber, because VSB-AM is the established modulation technique for television broadbase transmission. In coverting from coaxial cable to optical fiber, the least expensive alternative is to stay with VSB-AM and utilize as much of the existing network facilities as possible. Further, VSB-AM requires only 6 MHz per channel. Thus, VSB-AM is a "bandwidth efficient" way to transmit video signals.

On the negative side, VSB-AM is characterized by sensitivity to noise and many transmission impairments. However, lasers with lower intrinsic noise, such as Distributed Feedback (DFB) lasers, improve the carrier-to-noise ratio (CNR) of AM video transmission over fiber optic cable. Accordingly, VSB-AM remains a very viable choice for CATV systems. As demand grows and new services are added, increased capacity is required on CATV systems. One way of meeting the need for additional capacity is wavelength-division multiplexing (WDM) over optic fiber.

WDM allows transmission of different signals, modulated on different wavelengths, on the same optical fiber. Utilizing WDM, two sets of 77 NTSC channels may be carried on two wavelengths, to effectively double the capacity of the transmission without installing additional optical fibers.

However, WDM is not without its drawbacks. Nonlinearities in components of an analog fiber optic system produce distortion when multiple channels are transmitted. Typically, an analysis of nonlinear distortion includes measured or calculated levels of second-order and third-order products.

In second-order distortion, the discrete second order beat, when summed with many other discrete second order beats falling on the same frequency (due to other channel pairs), results in a composite second-order distortion (CSO). If large enough, CSO may interfere with the visual carrier. Recommendations for the levels of CSO distortion are −60 dBc by the National Cable Television Association (NCTA).

Third-order distortion is produced in the same manner as second-order distortion, but arises from an accumulation of third order beats. Third-order distortion is generally represented as a composite triple-beat (CTB) level. Like the CSO level, the acceptable limit for CTB is considered to be around −60 dBc.

A particular problem with WDM in analog CATV transmission relates to crosstalk caused by nonlinear distortion characteristics of the fiber optic components. As reported by A. Li et al. paper noted hereinabove, crosstalk levels of up to −40 dBc due to Stimulated Raman Scattering (SRS) were measured in a 1500 nm WDM AM CATV transmission system.

In the A. Li et al. experiment, up to 42 AM channels were applied to laser 1, which had a wavelength of 1558.0 nm, and a single tunable subcarrier channel was applied to laser 2, which had a wavelength of 1549.4 nm. When the longer wavelength channel was modulated by 42 AM channels, crosstalk with the same 42 subcarrier frequencies was observed in the shorter wavelength channel. At this 8.6 nm wavelength spacing and with the optical power level at 10 dBm in each wavelength channel, 10 km of dispersion shifted fiber induced an SRS crosstalk level on the order of −40 dBc.

Clearly, the WDM AM CATV transmission system in the A. Li et al. experiment has excessive SRS crosstalk, which would result in unacceptable levels of CSO and/or CTB. Thus, there exists a crosstalk problem with respect to WDM analog CATV transmission systems.

Referring to FIG. 1, shown therein and designated by reference numeral 10 is a wavelength-division-multiplexed (WDM) video transmission system constructed in accordance with the present invention. The system 10 is designed to carry analog CATV signals at two wavelengths $\lambda 1$ and $\lambda 2$ over an optical fiber with less crosstalk problem described in the A. Li et al. paper.

In particular, the system 10 includes a pair of optical sources 12 and 14, a pair of external modulators 16 and 18, a pair of video signals 20 and 22, a 3-dB combiner 24, an optical amplifier 26, a splitter 28, an attenuator 30, a length of optical fiber 32, a filter 34 and a receiver 36. A dithering device 38 is connected to the $\lambda 1$ optical source 12 and a polarization controller 40 is provided between the $\lambda 2$ modulator 18 and the combiner 24.

Each source 12 and 14 comprises a DFB laser and the modulators 16 and 18 utilized are optically linearized $LiNbO_3$ modulators. In an experimental arrangement, the modulators 16 and 18 are driven with signals 20 and 22 from independent Matrix multiple-frequency generators, each generating 77 NTSC channels between 55.25 and 535.25 MHz. The Optical Modulation Depth (OMD) on each transmitter 12 and 14 is 3% per channel. Of course, in actual CATV transmission, the modulators 16 and 18 would be driven by the video signals to be distributed to CATV subscribers.

The output of the $\lambda 2$ optical modulator 18 is passed through the polarization controller 40 to align the polarizations of the two transmitters 12 and 14. By aligning the polarizations of the two transmitters 12 and 14, SRS crosstalk caused by the polarization states of the two transmitters 12 and 14 is maximized. Thus, the test system should represent a worst-case for SRS. After passing the output of the $\lambda 2$ optical transmitter 14 through the polarization controller 40, the $\lambda 1$ and $\lambda 2$ outputs are combined in the 3-dB combiner 24 and launched into the optical amplifier 26, which is a two-stage, 980 nm-pumped erbium-doped fiber amplifier (EDFA) with a saturated output power of +22 dBm. The output of the optical amplifier 26 is provided to the splitter 28, which divides the output four ways.

One of the outputs 42 from the splitter 28 is passed to the attenuator 30 and launched into the length of optical fiber 32 with dispersion zero at 1.3 $\mu$m. In the experimental arrangement, a 13-km long conventional optical fiber was utilized and connected to the optical filter 34, which had a >40 dB selectivity. The output of the filter 34 was provided to the receiver 36, which was a commercial CATV receiver.

Figure 2:
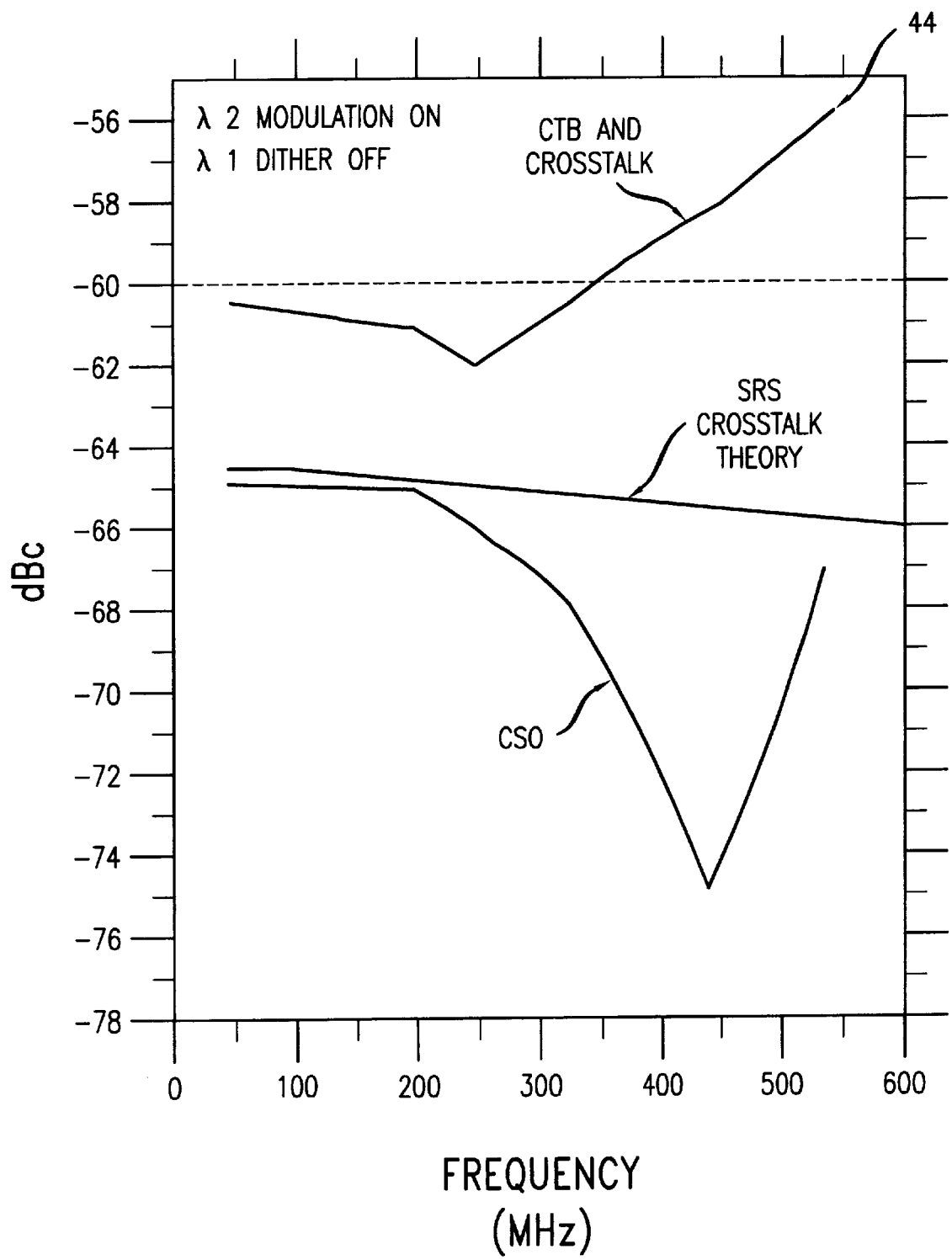
FIG. 2 is a graph of the Composite Triple Beat (CTB) and Composite Second Order (CSO) distortions versus frequency in the video carried by the longer wavelength $\lambda 1$ in the video transmission system of FIG. 1. Modulation of the shorter wavelength $\lambda 2$ is on and the dither for wavelength $\lambda 1$ is off.

At first, the experimental arrangement of the system 10 was tested with a wide wavelength spacing of $\Delta\lambda = (\lambda 1 - \lambda 2)$ of 12 nm and a launched power of +9 dBm/wavelength. Under these conditions, crosstalk levels as large as −49 dBc were observed, with the most severe crosstalk occurring at the lowest frequency. Next, $\Delta\lambda$ was changed to a value of 2.2 nm. FIG. 2 illustrates the crosstalk induced into the $\lambda 1$ wavelength channel with RF modulation present on the $\lambda 2$ wavelength channel.

As shown in FIG. 2, the measured Composite Triple Beat (CTB) and crosstalk (which appears as CTB) is less than −60 dBc for frequencies between 56.25 and 349.25 MHz. However, CTB dramatically increases from 349.25 MHz and reaches −56 dBc at 535.25 MHz, as indicated by reference numeral 44. Although the 2.2 nm wavelength channel spacing results in significantly less severe crosstalk in the lower frequencies of the 77 NTSC channels, CTB is still too high to be acceptable in the higher frequencies.

It should be noted that second-order distortion CSO in FIG. 2 is well below the −60 dBc acceptable limit throughout the entire frequency range of the 77 NTSC channels. Further, the curve labeled SRS Crosstalk Theory illustrates the SRS crosstalk levels predicted under the theory of the A. Li et al. paper.

Figure 3:
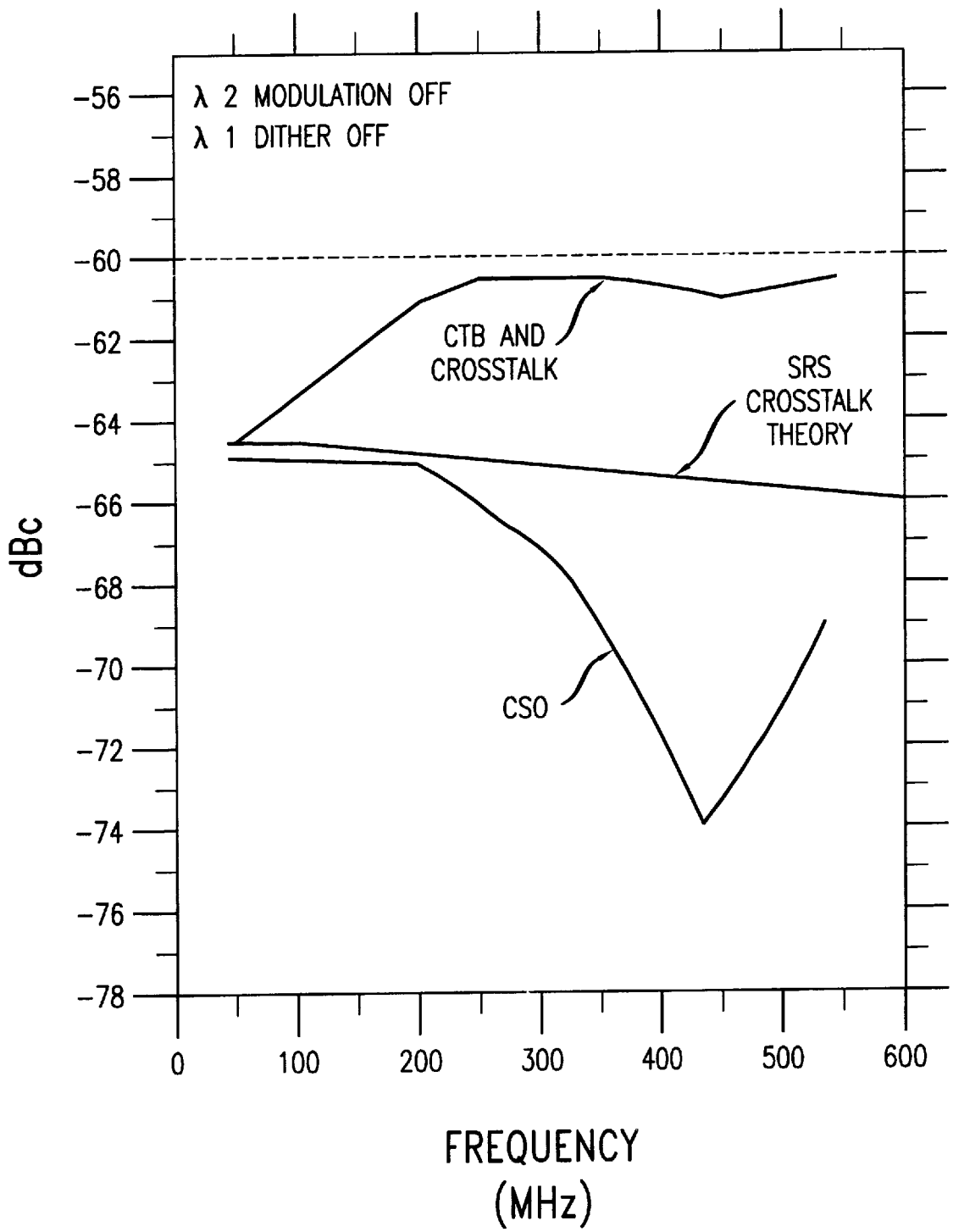
FIG. 3 is a graph of CTB and CSO distortions versus frequency in the video carried by wavelength $\lambda 1$ with modulation of wavelength $\lambda 2$ off and the dither for wavelength $\lambda 1$ off.

With reference to FIG. 3, shown therein are crosstalk curves for 2.2 nm wavelength spacing with $\lambda 2$ RF modulation off. It should be noted that with an unmodulated $\lambda 2$ signal, CTB is below the −60 dBc acceptable limit throughout the entire frequency range of 55.25 to 535.25 MHz. Composite Second-Order (CSO) distortion remains at acceptable levels with $\lambda 2$ RF modulation off. Those skilled in the art will recognize that the reduction of crosstalk depicted in FIG. 3 as compared with that depicted in FIG. 2, indicates that the signal depicted is, in fact crosstalk and not CTB.

Figure 4:
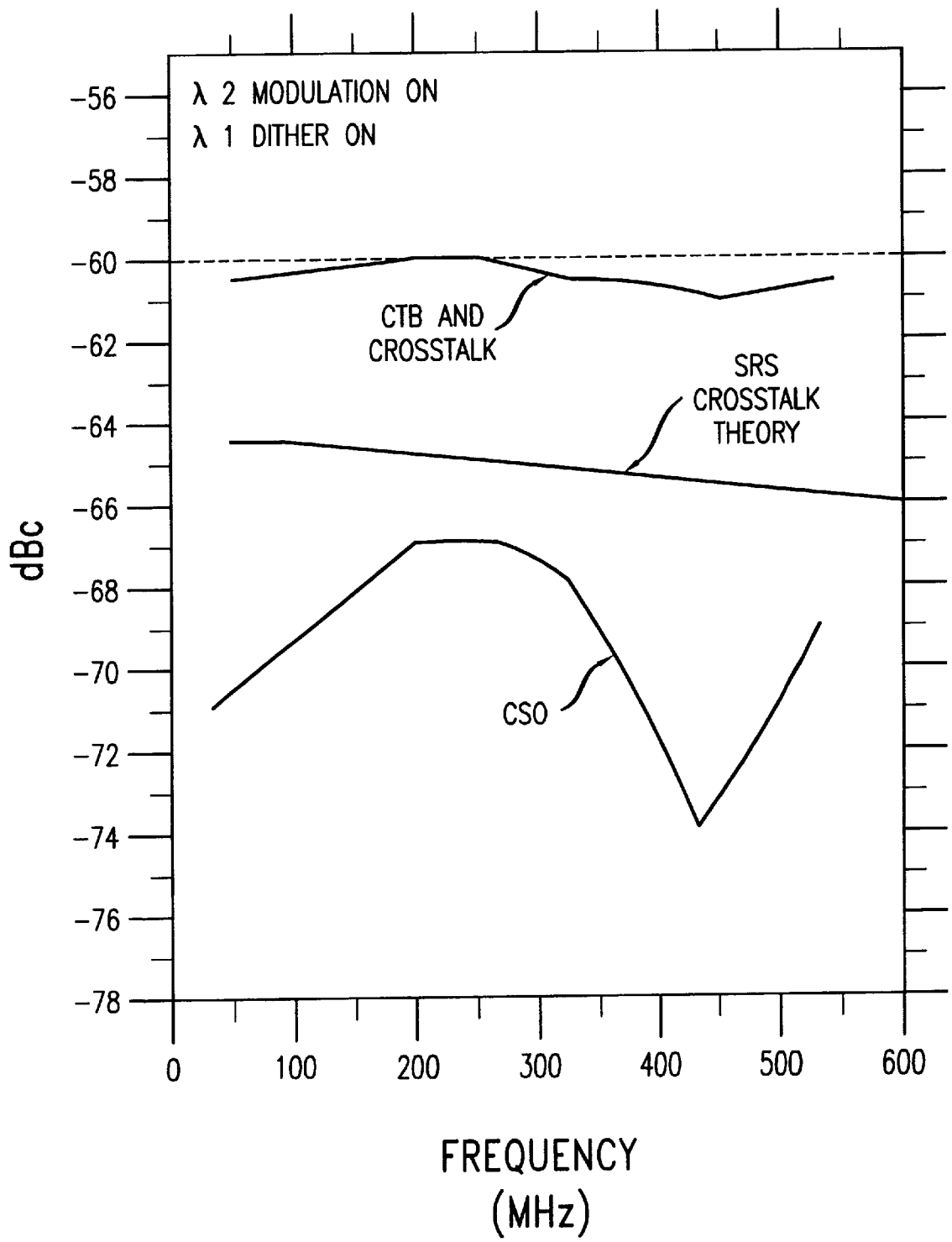
Figure 5:
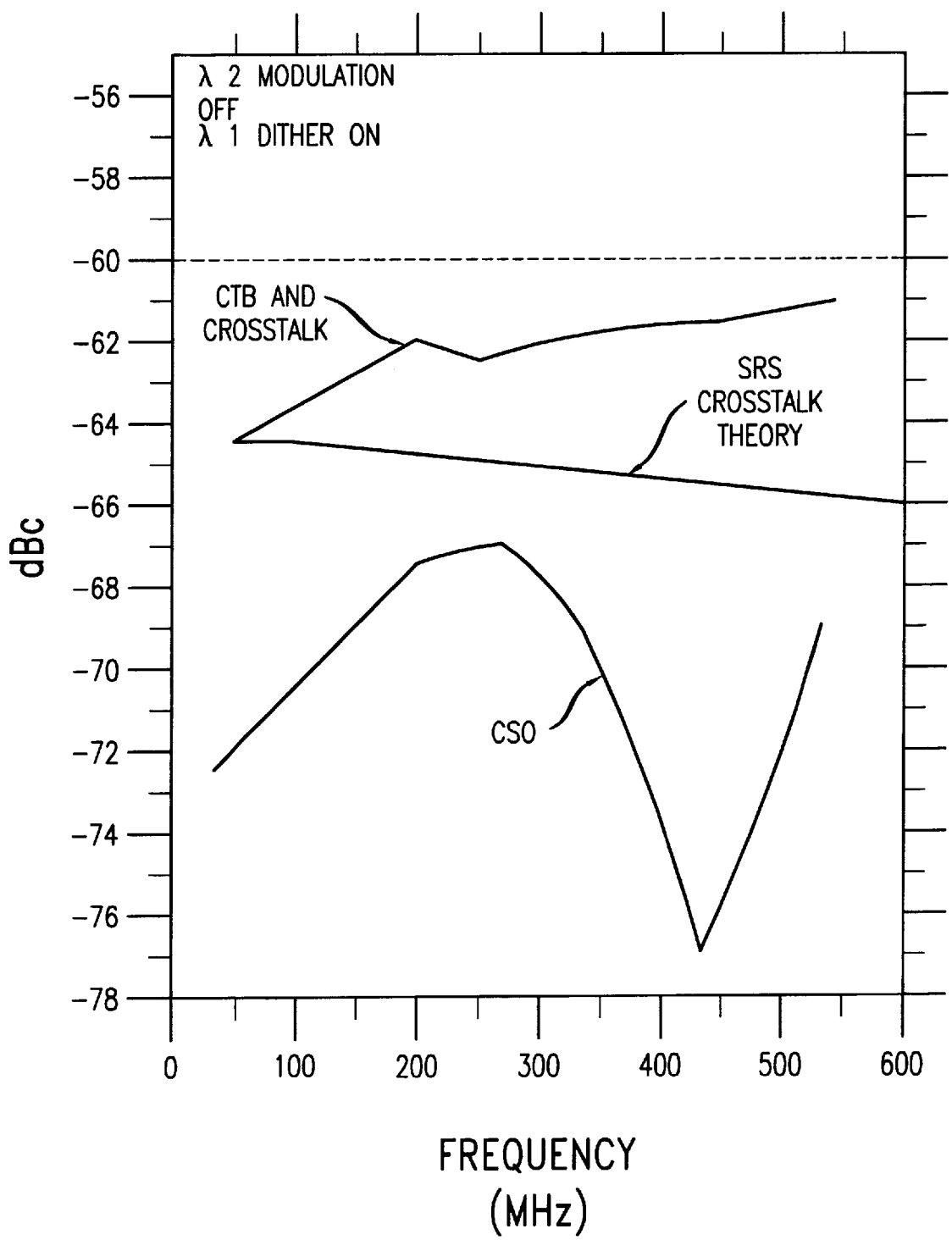

The crosstalk in the frequencies between 349.25 and 535.25 MHz in FIG. 2 must be corrected in order to provide acceptable WDM analog CATV transmission. To this end, the dithering device 38 utilized to apply a dithering tone to the $\lambda 1$ laser transmitter 12. The dithering device 38 has a 10 percent Optical Modulation Depth (OMD) and is capable of applying a 2-GHz dither to the $\lambda 1$ laser 12. FIGS. 4 and 5 illustrate $\lambda 1$ crosstalk with the dithering tone applied to the $\lambda 1$ laser.

Referring to FIG. 4, for the CTB and CSO levels shown therein, $\lambda 2$ RF modulation is on and the $\lambda 1$ dither is applied. By comparing FIG. 4 with FIG. 2, it can be seen that the dithering has caused the CTB curve to be reduced. Further, the CTB curve is within the acceptable level of −60 dBc for the 77 NTSC channels between 55.25 and 535.25 MHz. In other words, by dithering the laser transmitter 12, the worst channel effective CTB is reduced to the −60 dBc level. Under these circumstances, the worst apparent CTB (−60.1 dBc) occurs on the 199.25 and 247.25 MHz channels.

The decrease in crosstalk from dithering the $\lambda 1$ laser is contrary to expectations about a broad nonlinearity like SRS. See, for example, A. R. Chraplyvy, "Limitations on Lightwave Communications Imposed by Optical-Fiber Nonlinearities," *J. Lightwave Technol.* 8, 1548–1557 (1990). Nevertheless, the results from the experimental arrangement of the system 10, as illustrated by FIG. 4, show that the $\lambda 1$ dithering introduces a marked reduction into the CTB curve and brings the CTB levels below the −60 dBc line.

With reference to FIG. 5, shown therein are CTB and CSE curves for 2.2 nm wavelength spacing with $\lambda 1$ dither on. The CTB and CSO curves are both in acceptable ranges between 55.25 and 535.25 MHz. By comparing FIG. 5 with FIG. 3, it can be seen that the $\lambda 1$ dithering improves the CTB curve in the middle and upper frequencies, but by only 1 dB or so.

Figure 6:
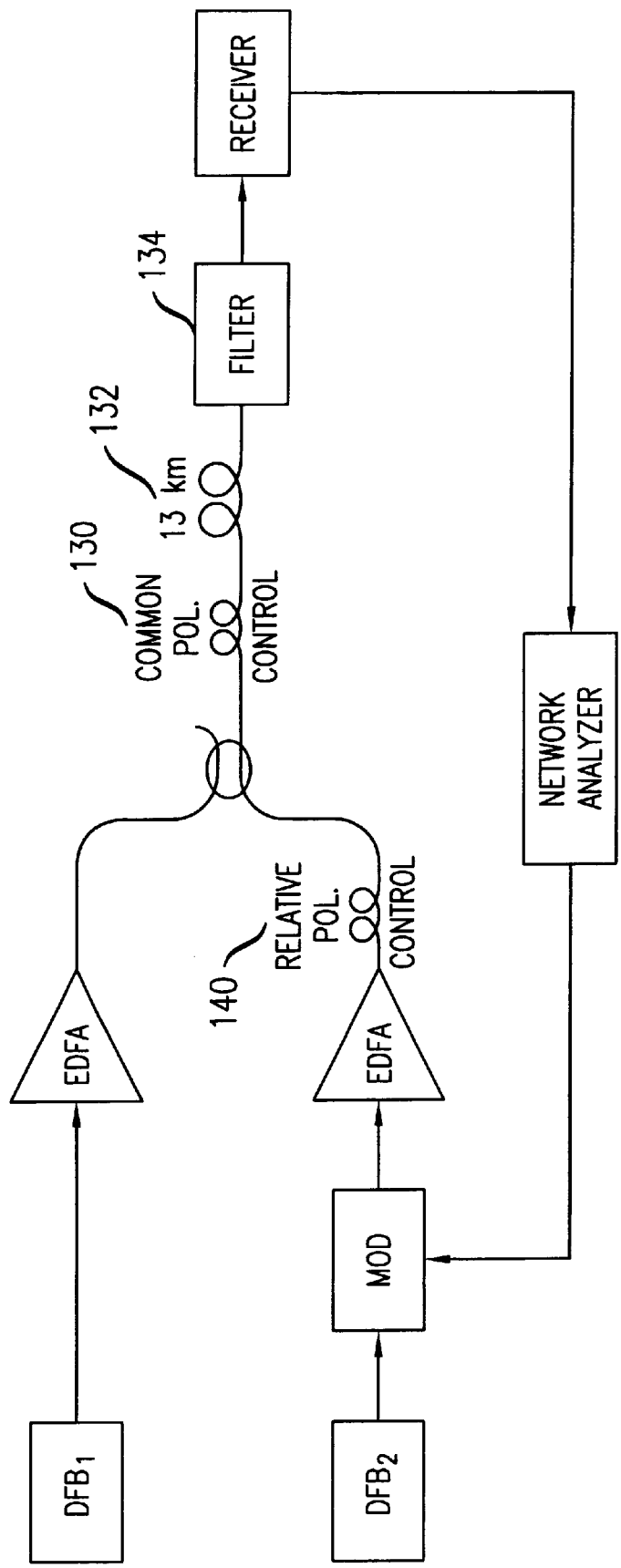
FIG. 6 shows a setup used to perform crosstalk measurements.

In addition to the measurements described above, measurements of the crosstalk were performed with the setup shown in FIG. 6. This differs from the setup shown in FIG. 1 of the instant application, primarily in that the single EDFA (item 26) has been replaced by two EDFAs, and that a network analyzer has been connected between the $\lambda 2$ modulator and the optical receiver, instead of using two video sources (items 20 and 22). By imparting these changes we eliminate crosstalk in the EDFA and thereby can study the crosstalk impairment without having to observe it in the presence of the CTB contributions from the modulators 16 and 18. Also, instead of observing the crosstalk at 6 discrete frequencies, we are now able to observe it at a much larger number of frequencies. Also shown is an additional polarization controller, 130, which can control the common launched polarization of the two wavelengths. The purpose of this new polarization controller will become apparent soon.

Figure 7:
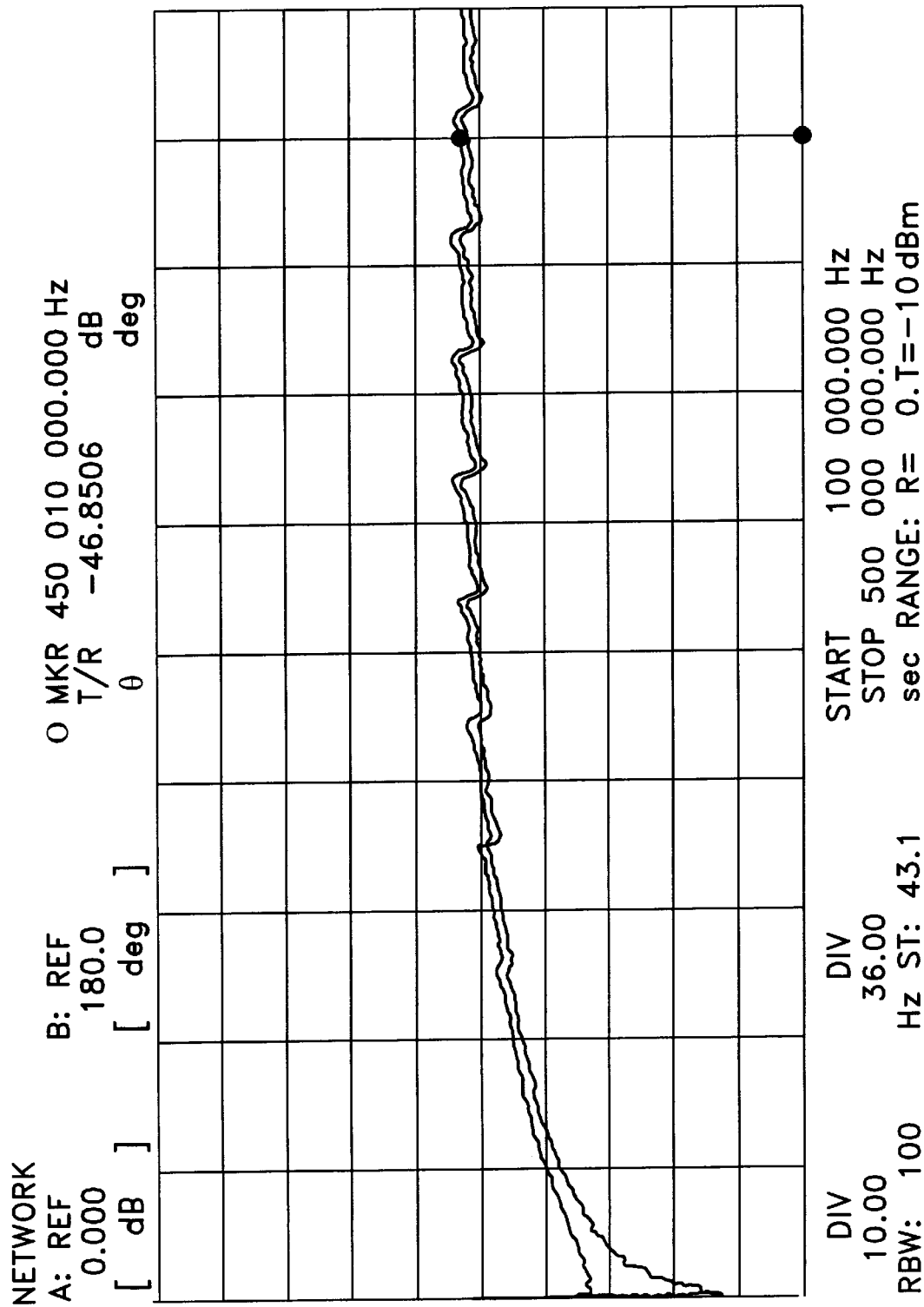
FIG. 7 shows an example of a first set of measurements made using the arrangement of FIG. 6.

FIG. 7 shows an example of the measurements with this new apparatus. The horizontal axis shows the crosstalk frequency, varying from 100 KHz to 500 MHz. The vertical axis shows the crosstalk from the $\lambda 2$ wavelength into the $\lambda 1$ wavelength when each wavelength launched +9 dBm into the transmission fiber. The vertical scale is 10 dB/division, and unity crosstalk (0 dB) corresponds to the top of the graph. The system measures crosstalk because the signal from the network analyzer is applied to the $\lambda 2$ wavelength and the optical filter 134 is tuned to pass only the $\lambda 1$ wavelength. For these data, the relative polarization controller 140 was adjusted so that the polarizations of the two wavelengths were parallel. For the upper curve, the common polarization controller 130 was adjusted to maximize the observed crosstalk at a frequency of 450 MHz. A maximum crosstalk of approximately −45 dB is observed. The lower curve shows the observed crosstalk when the common polarization controller 130 was adjusted for minimum crosstalk at a frequency of 450 MHz.

This figure demonstrates that, even when the relative polarizations of the $\lambda 1$ and $\lambda 2$ beams (adjusted with relative polarization controller 140) are kept parallel, the observed crosstalk varies significantly based on changes in their common launched polarization (adjusted with the common polarization controller 130). We believe this effect is due to the polarization mode dispersion (PMD) of the transmission fiber 132 and the polarization-dependent loss (PDL) of the filter 134. We measured the PMD of the transmission fiber 132 to be approximately 0.4 ps, and the PDL of the filter 134 to be approximately 0.12 dB. Reducing these values should lead to a reduction in the difference between the upper and lower curves in FIGS. 7 and 8, and perhaps to the maximum observed crosstalk.

Figure 8:
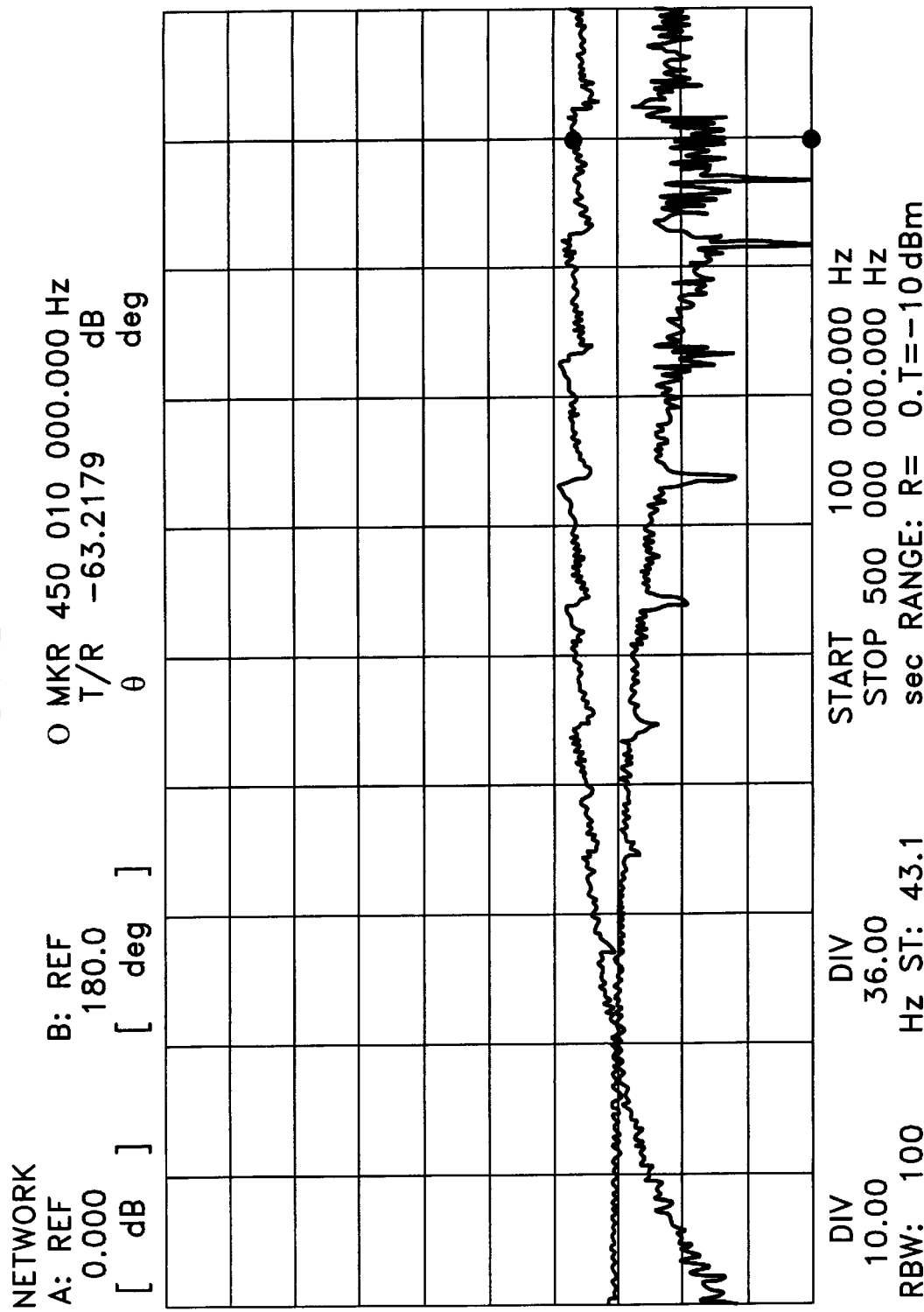
FIG. 8 shows an example of another set of measurements made using the arrangement of FIG. 6.

FIG. 8 shows the crosstalk for conditions similar to that of FIG. 7, but now with an 11% optical modulation depth (OMD) 2.0 GHz dither tone applied to the $\lambda 1$ laser. The upper and lower curves are again generated by varying the common polarization controller 130 to maximize or minimize the observed crosstalk at a frequency of 450 MHz. It is seen that the highest crosstalk observed, approximately −61 dB, is significantly less than that observed in FIG. 7 without the dither.

Figure 9:
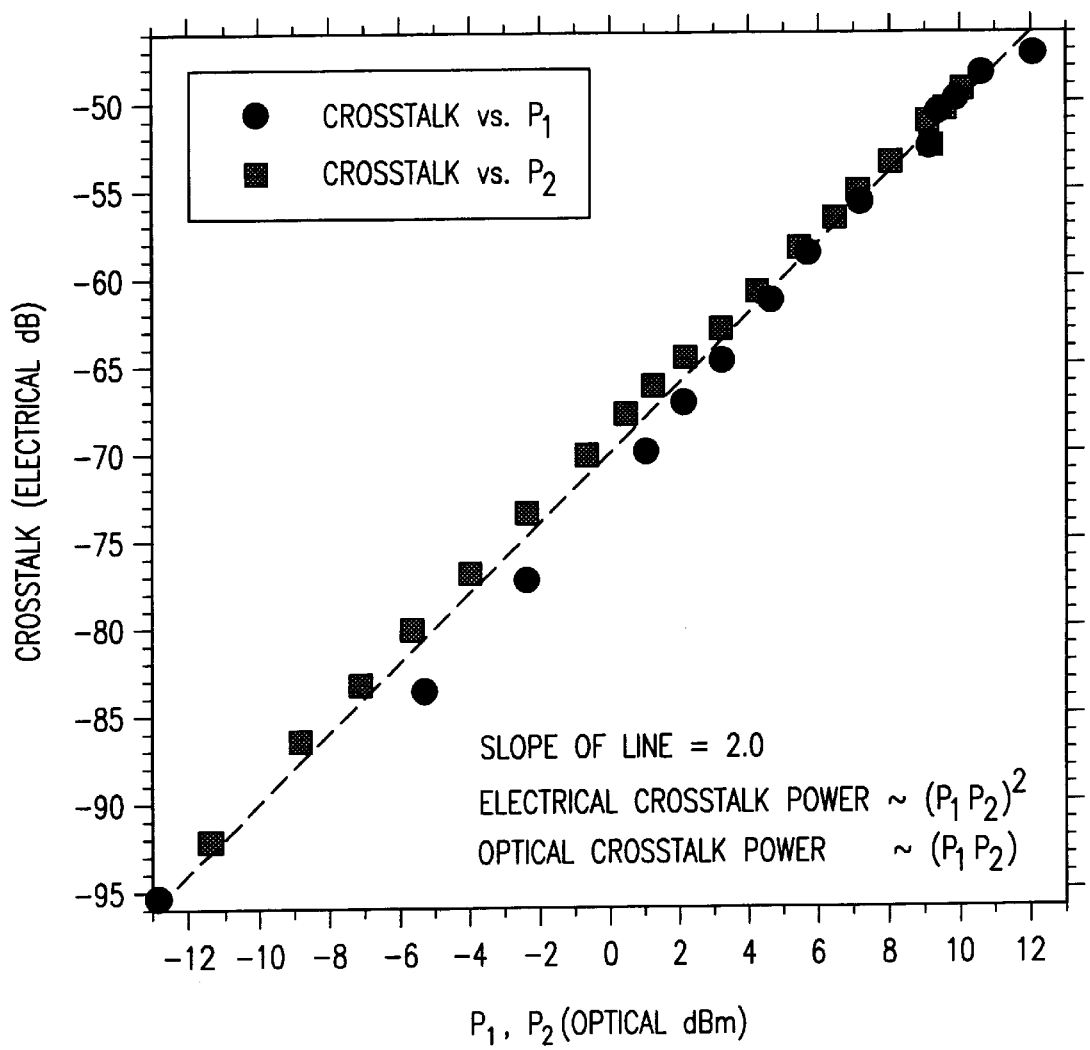
FIG. 9 shows observed crosstalk measured for a particular set of experimental parameters.

To help understand the mechanism of this crosstalk, we have measured its dependence on the launched powers in the two wavelengths, P1 and P2. FIG. 9 shows the observed crosstalk at a frequency of 450 MHz without dither when P1 and P2 are separately varied. As P1 was varied, P2 was kept at +9 dBm, and as P2 was varied, P1 was kept at +9 dBm. Both data sets in FIG. 9 show a slope of 2.0 electrical dB/optical dBm. Since it is well known that a 1 dB change in optical power generates a 2 dB change in detected electrical power, this is consistent with a crosstalk mechanism that generates optical crosstalk proportional to P1*P2.

We have also observed changes in the effectiveness of the dithering as we vary the relative polarizations of the λ1 and λ2 beams with the relative polarization controller 140. The data in FIGS. 7 and 8 show that good crosstalk suppression by the dither is achieved when the relative polarization of the beams is parallel. We also observe good suppression when the relative polarization of the beams is perpendicular. However, for an intermediate state, such as when one beam is linearly polarized and the other is circularly polarized, the dither actually produces a small increase in the maximum observed crosstalk.

It should be apparent from the foregoing disclosure that the system 10 provides two-wavelength WDM analog CATV transmission with acceptably low levels of crosstalk. The use of 2.2 nm wavelength spacing and laser-dithering brings CTB levels below −60 dBc throughout the frequency range of the 77 NTSC channels. Accordingly, the present invention may permit the deployment of WDM analog CATV systems.

The foregoing merely illustrates the principles of the invention. Thus, for example, there are several ways of dithering a source. We have demonstrated dithering by modulating a laser's drive current. It is well known in the literature that other methods of dithering are possible. For example, one can put the beam through a phase modulator, and dither the phase of the light at a high frequency, such as 2 GHz. For a good general reference on both kinds of dithering to reduce the effect of Stimulated Brillouin Scattering (SBS), another fiber nonlinearity that affects transmission with a single wavelength, see F. Willems, et al., "Simultaneous Suppression of Stimulated Brillouin Scattering and Interferometric Noise in Externally Modulated Lightwave AM-SCM Systems", *Phot. Technol. Lett.*, 6, 1476–1478 (1994).

In addition, we believe our invention is applicable to systems with two or more wavelengths, not just two wavelengths. Such systems might also employ various relative launched polarizations between the channels. For example, one might want to launch λ1 and λ2 with mutually parallel polarizations and a narrow Δλ12, and λ3 and λ4 with mutually parallel polarizations and a narrow Δλ34, but keep the spacing Δλ23 large and the polarizations of beams 3 and 4 orthogonal.

It should be appreciated that the present invention is not necessarily limited to one video technique, such as AM-VSB transmission. Further, it is contemplated that the present invention may be practiced in conjunction with a wide variety of optical transmitters, modulators, polarization controllers, amplifiers, combiners, couplers, multiplexers, demultiplexers, splitters, attenuators, optical fibers, filters and receivers. Moreover, although we have studied and discussed our invention in the context of analog video transmission, other signal formats might also benefit from this invention. Any format that requires very high levels of crosstalk suppression might benefit. For example, optical systems that are used to carry analog signals to and from remote antennas may benefit from this invention if they wish to incorporate WDM. Additionally, digital systems based on advanced modulation formats, such as QAM, would also benefit by employing our teachings if they wish to incorporate WDM, as well as WDM systems carrying mixed analog and digital signals.

The elements, features, steps and procedures described herein are intended to illustrate the preferred embodiments of the present invention, and are not to be regarded as limiting the scope of the invention. Accordingly, changes may be made in the combination and arrangement of the various elements, features, steps and procedures described herein without departing from the spirit and scope of the invention.

The invention claimed is:

1. An apparatus for transmitting signals over an optical fiber, said apparatus comprising:
   a plurality of fiber optic sources producing a plurality of wavelengths, a first one of said fiber optic sources producing a first output having a first wavelength and a second one of said plurality of fiber optic sources producing a second output having a second wavelength, wherein the first output wavelength and the second output wavelength has a difference of substantially 2.2 nanometers;
   a means for modulating the first and second outputs of the fiber optic sources with signals to produce first and second modulated outputs;
   a means for combining the first and second modulated outputs to produce a wavelength-division-multiplexed output;
   an optical fiber having a transmitter end and a receiver end, the transmitter end of the optical fiber being adapted to receive the wavelength-division-multiplexed output; and
   means for applying a dither to at least one of the fiber optic transmitters such that the dither reduces crosstalk in the signals of the wavelength division multiplexed output at the receiver end of the optical fiber.

2. The apparatus of claim 1 wherein the fiber optic transmitters include a distributed feedback laser.

3. The apparatus of claim 1 wherein the dither is further characterized as having an optical modulation depth of approximately 10%.

4. The apparatus of claim 1 wherein the dither is further characterized as having a frequency of approximately 2 Ghz.

5. The apparatus of claim 1 wherein the further characterized as having an optical modulation depth of about 10% and a frequency of about 2 GHz.

6. The apparatus of claim 1 wherein the means for applying a dither further comprises:
   means for applying a dither to the one of the first and second fiber optic transmitters having the output which is longer in wavelength.

7. The apparatus of claim 1 wherein said plurality of fiber optic sources consists of a pair of fiber optic sources.

8. The apparatus of claim 7 further comprising:
   means for adjusting relative polarizations of the first and second outputs from the first and second fiber optic transmitters to a predetermined state.

9. The apparatus of claim 8 wherein said predetermined states are aligned.

10. The apparatus of claim 8 wherein said predetermined states are crossed.

11. The apparatus of claim 1 further comprising:
    means for amplifying the wavelength-division-multiplexed output before the wavelength-division-multiplexed output is launched into the transmitter end of the optical fiber.

12. The apparatus of claim 1 wherein said optical fiber is part of a telecommunications network having a sufficiently low PMD and a sufficiently low PDL.

13. The apparatus of claim 12 wherein said PDL is less than 1.0 dB.

14. The apparatus of claim 12 wherein said PDL is less than 1.0 picosecond.

15. The apparatus of claim 1 wherein said signals are in an appropriate analog signal format.

16. The apparatus of claim 1 wherein said signals are QAM signals.

17. The apparatus of claim 1 wherein said signals are AM-VSB signals.

18. A method of transmitting wavelength-division-multiplexed signals over an optical fiber, the method comprising the steps of:
- providing a plurality of fiber optic sources, one of said plurality of fiber optic sources producing an output having a first wavelength and another one of said plurality of fiber optic sources producing an output having a second wavelength, the difference between the first and second wavelengths being approximately 2.2 nanometers;
- modulating the first and second outputs of the fiber optic transmitters with signals to produce first and second modulated outputs;
- multiplexing the first and second modulated outputs to produce a wavelength-division-multiplexed output;
- providing an optical fiber having a transmitter end and a receiver end, launching the wavelength-division-multiplexed output into the transmitter end of the optical fiber; and
- dithering at least one of the fiber optic transmitters to reduce crosstalk between the signal at the receiver end of the optical fiber.

19. The method of claim 18 wherein the dithering step is further characterized as applying a dither having an optical modulation depth of about 10% and a frequency of about 2 GHz.

20. The method of claim 18 wherein the dithering step is further characterized as applying a dither to the one of the first and second sources having the output which is longer in wavelength.

21. An apparatus for transmitting signals over an optical fiber, said apparatus comprising:
- a plurality of fiber optic sources producing a plurality of wavelengths, a first one of said plurality of fiber optic sources producing a first output having a first wavelength and a second one of said plurality of fiber optic sources producing a second output having a second wavelength, the difference between the first wavelength and the second wavelength being approximately 2.2 nanometers;
- means for modulating the first and second outputs of the fiber optic sources with signals to produce first and second modulated outputs;
- means for combining the first and second modulated outputs to produce a wavelength-division-multiplexed output, and an optical fiber having a transmitter end and a receiver end, the transmitter end of the fiber optic cable being adapted to receive the wavelength-division-multiplexed output; and
- means for applying a dither to at least one of the fiber optic sources such that the dither reduces crosstalk in the analog video signals of the wavelength-division-multiplexed output at the receiver end of the optical fiber;
- wherein the difference of about 2.2 nanometers between the first wavelength and the second wavelength reduces crosstalk noise in the signals of the wavelength-division-multiplexed output at the receiver end of the optical fiber.

22. The apparatus of claim 21 wherein the fiber optic sources include a distributed feedback laser.

23. The apparatus of claim 21 wherein the dither is further characterized as having an optical modulation depth of approximately 10%.

24. The apparatus of claim 21 wherein the dither is further characterized as having a frequency of approximately 2 GHz.

25. The apparatus of claim 21 wherein the dither is further characterized as having an optical modulation depth of about 10% and a frequency of about 2 GHz.

26. The apparatus of claim 21 wherein the means for applying a dither further comprises means for applying a dither to the one of the first and second fiber optic transmitters having the output which is longer in wavelength.

27. The apparatus of claim 21 further comprising:
- means for adjusting relative polarizations of the first and second outputs from the first and second fiber optic transmitters to a predetermined state.

28. The apparatus of claim 27 wherein said predetermined states are aligned.

29. The apparatus of claim 27 wherein said predetermined states are crossed.

30. The apparatus of claim 21 wherein said optical fiber is part of a telecommunications network having a sufficiently low PMD and a sufficiently low PDL.

31. The apparatus of claim 30 wherein said PDL is less than 1.0 dB.

32. The apparatus of claim 30 wherein said PMD is less than 1.0 picosecond.

33. The apparatus of claim 21 further comprising:
- means for amplifying the wavelength-division-multiplexed output before the wavelength-division-multiplexed output is launched into the transmitter end of the optical fiber.

34. An apparatus for wavelength-division-multiplexed transmission over an optical fiber, the apparatus comprising:
- a plurality of optical transmitters producing outputs launched into an optical fiber at a wavelength spacing of about 2.2 nanometers; and
- means for dithering at least one of the optical transmitters such that CATV signals are satisfactorily transmitted over the optical fiber while exhibiting a sufficiently small amount of crosstalk.

35. The apparatus of claim 34 wherein the means for dithering is further characterized as applying a dither having a frequency of approximately 2 GHz.

36. A method of wavelength-division-multiplexed transmission over an optical fiber, the steps of the method comprising:
- providing a plurality of optical transmitters producing outputs launched into an optical fiber at a wavelength spacing of about 2.2 nanometers; and
- applying a dithering tone to at least one of the optical transmitters such that CATV signals are satisfactorily transmitted over said optical fiber while exhibiting a sufficiently small amount of crosstalk.

37. The method of claim 26 wherein the step of applying a dithering tone is further characterized as applying a dithering tone having a frequency of about 2 GHz.

* * * * *